APPARATUS FOR MANUFACTURING SELENIUM RECTIFIERS

Filed June 14, 1962 3 Sheets-Sheet 1

INVENTORS
HAROLD B. ROSENBERG
SEYMOUR SCHOMBERG
BY
Michael Ebert
ATTORNEY

INVENTORS
HAROLD B. ROSENBERG
SEYMOUR SCHOMBERG
BY Michael Ebert
ATTORNEY

Jan. 7, 1964 H. B. ROSENBERG ETAL 3,116,657

APPARATUS FOR MANUFACTURING SELENIUM RECTIFIERS

Filed June 14, 1962 3 Sheets-Sheet 3

INVENTORS
HAROLD B. ROSENBERG
SEYMOUR SCHOMBERG
BY Michael Ebert
ATTORNEY

United States Patent Office
3,116,657
Patented Jan. 7, 1964

3,116,657
APPARATUS FOR MANUFACTURING SELENIUM RECTIFIERS
Harold B. Rosenberg, New Rochelle, and Seymour Schomberg, Brooklyn, N.Y., assignors to Electronic Devices, Inc., New Rochelle, N.Y., a corporation of Delaware
Filed June 14, 1962, Ser. No. 202,585
12 Claims. (Cl. 83—92)

This invention relates generally to techniques for producing stacked selenium rectifiers of the cartridge type, and more particularly to a mechanism adapted automatically and efficiently to die cut selenium rectifier plates into individual cells and to stack such cells into a cartridge.

Selenium rectifiers are currently available as a substitute for conventional vacuum tube rectifiers for radio and television receivers, and in various other applications requiring the conversion of alternating into direct current. Selenium rectifiers offer the advantages of greater compactness, less production of heat, longer life and immediate operation. The trend toward completely transistorized amplifiers, receivers and other electronic devices operating from an alternating-current power line has markedly increased the commercial importance of selenium rectifiers, for only by the use of such rectifiers is it possible to build portable electronic apparatus composed entirely of solid-state, heater-free elements.

Individual selenium rectifier cells have a relatively low voltage rating, in the order of 35 volts, and it is often necessary therefore to stack a series of coin-like cells to form a cartridge. The conventional practice is to die-cut the cells from a plate formed by a selenium layer sandwiched between front and counter electrode metal layers, such as aluminum and tin. The individual discs are then tested before being manually inserted, one by one, into an insulating cartridge tube. The cells must face in the same direction to maintain their proper polarity.

The usual production technique for assembling selenium cells is both time-consuming and costly, with the result that selenium rectifiers are quite expensive as compared to vacuum tube types. When the selenium plate is die-punched, microscopic shorts occur by reason of burrs formed on the cell edges, edge rubbing or dragging of the layer material, as well as contamination due to dirt. It is necessary, therefore, to electrically shock individual cells before attacking them, to eliminate shorts.

Thus while selenium rectifiers are desirable substitutes for vacuum rectifiers in many modern applications, the high costs of such rectifiers have militated against their widespread adoption by equipment manufacturers.

Accordingly, it is the principal object of this invention to provide an automatic mechanism for die-cutting and assembling selenium cells to form a cartridge-type rectifier.

More specifically, it is an object of the invention to provide a mechanism adapted to die-punch individual cells from a selenium sheet, the cells being punched directly into cartridge tubes and being stacked therein.

A significant feature of the invention resides in the use of counter pins acting in conjunction with the die punches to effect a clean cutting action and to prevent tumbling of the cells.

Also an object of the invention is to provide a magazine for supporting a plurality of cartridge casings while the selenium cells are being stacked therein, and fixtures attachable to the magazine after the casings are filled, to facilitate the cleaning of stacked cells and the application of end caps to the cartridges.

Yet another object of the invention is to provide an automatic, high speed and mass-production method and machine for assembling cartridge-type selenium rectifiers at low cost. An important advantage of the invention is that the reduction in production cost is accompanied by an improvement in the quality of the rectifier, for the individual cells are clean-cut and are free of shorts, as compared to those made by individual handling techniques.

Briefly stated, these objects are accomplished in a die-cutting mechanism wherein a row of die punches is reciprocated relative to a die block to punch individual cells out of a selenium sheet which is advanced step by step with respect to a corresponding row of die apertures. Mounted below the die block is a magazine which supports a battery of insulating cartridge casings in registration with the die apertures, while extending through the casings are counter pins. The pins are mounted on an elevator block, and at their uppermost position they pass through the die apertures to engage the under surface of the selenium sheet being die-punched. The elevator is coupled to a hydraulic check system, and with each operating stroke of the punches, the battery of counter pins is forced one step downward to an extent equal to the thickness of the individual cells. Thus as the punches operate repeatedly, the individual cells are successively pushed out of the die to form stacks within the battery casings, and as the size of the stacks increases, the counter pins progressively recede, but at no time are the cells in the stack free to tumble. When the casings are filled, the magazine is removed from the die-cutting mechanism and is coupled to a fixture adapted to facilitate the cleaning of the cells within the casings, and the end-capping thereof.

For a better understanding of the invention, as well as other objects and further features thereof, reference is had to the following detailed description to be read in conjunction with the accompanying drawings, wherein.

Figures 4, 5, 6, 7, 9, 10:
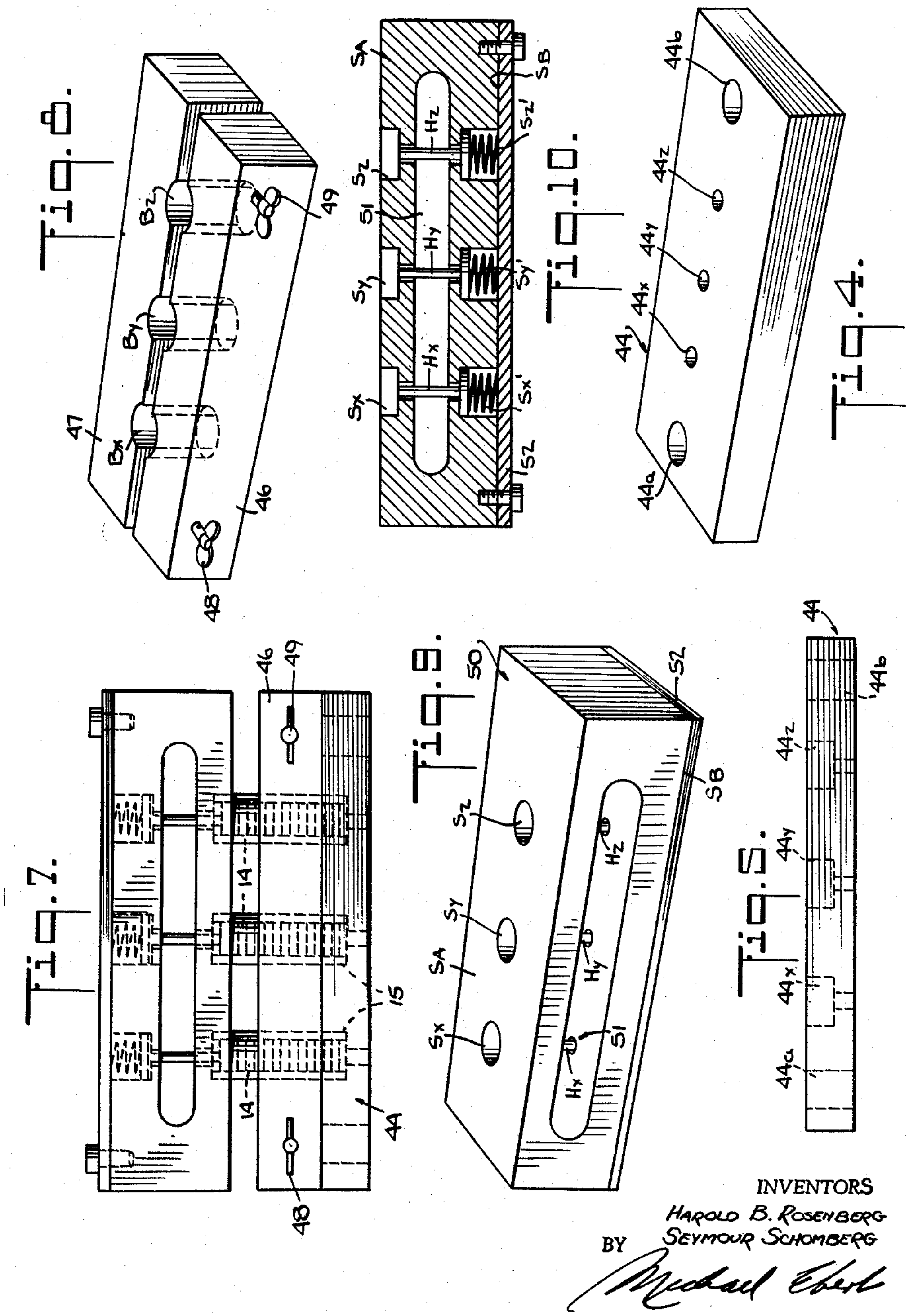
FIG. 4 is a perspective view of the cartridge-loading magazine included in the mechanism.
FIG. 5 is a longitudinal section taken through said mechanism.
FIG. 7 shows the loaded magazine, after removal from the machine, assembled into a clamping block and work handling fixture.

FIG. 8 separately shows the clamping block in perspective;

FIG. 9 shows the fixture in perspective, and

FIG. 10 shows a longitudinal section taken through the fixture.

Figure 1:
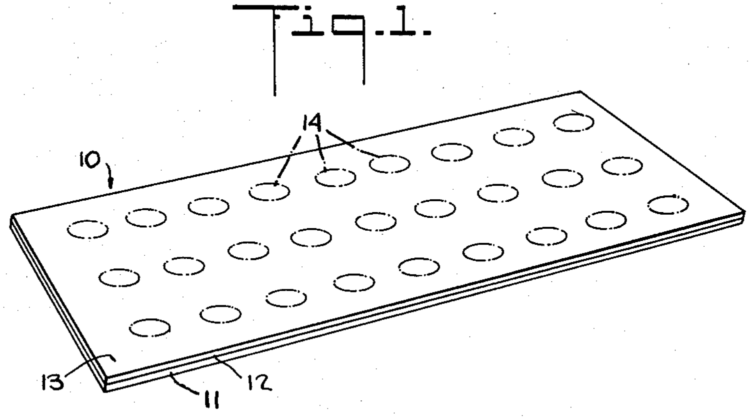
FIG. 1 is a perspective view of a selenium rectifier plate from which individual cells are punched out.

Referring now to the drawings, and more particularly to FIG. 1, there is shown a typical selenium rectifier stock plate before it is die-punched into individual cells. The plate, generally designated by numeral 10, consists of a front electrode or base layer 11, usually of etched aluminum or steel which has been nickel or bismuth-plated. A thin film 12 of specially treated amorphous selenium is applied as by vacuum deposition to one side of the base layer. A series of controlled heat treatments is given to the selenium film to produce the desired crystalline structure. By means of various chemical processes, a blocking or barrier layer may be subsequently applied. The counter electrode 13, consisting either of cadmium or a tin alloy, is metal sprayed or vacuum deposited on the selenium surface. The fabrication of the stock plate forms no part of the present invention, and commercially available stock may be used.

The plate is die-cut by a succession of steps, into coins or discs, as indicated by the dotted circles, each of which constitutes a single cell. A transverse row of cells is cut from the stock with each multiple punch operation. It is to be understood that while the invention is described in connection with circular disc-shaped cells, in practice other forms may be used such as square or rectangular cells.

Figure 2:
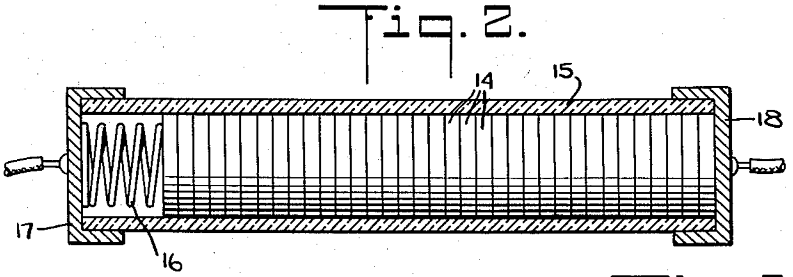
FIG. 2 is a longitudinal section taken through a typical cartridge-type stacked selenium rectifiers.

The cells 14 are stacked within a cartridge, as illustrated in FIG. 2, the cartridge comprising an insulating casing 15, of fiber or glass or other suitable materials, the cells being mounted under contact pressure in face-to-face relation by a spring 16 interposed between one end of the stack and an end terminal cap 17. Another terminal cap 18 is fitted over the other end of the casing to complete the structure. The arrangement shown in FIG. 2 is that of a standard selenium rectifier cartridge.

Figure 3:
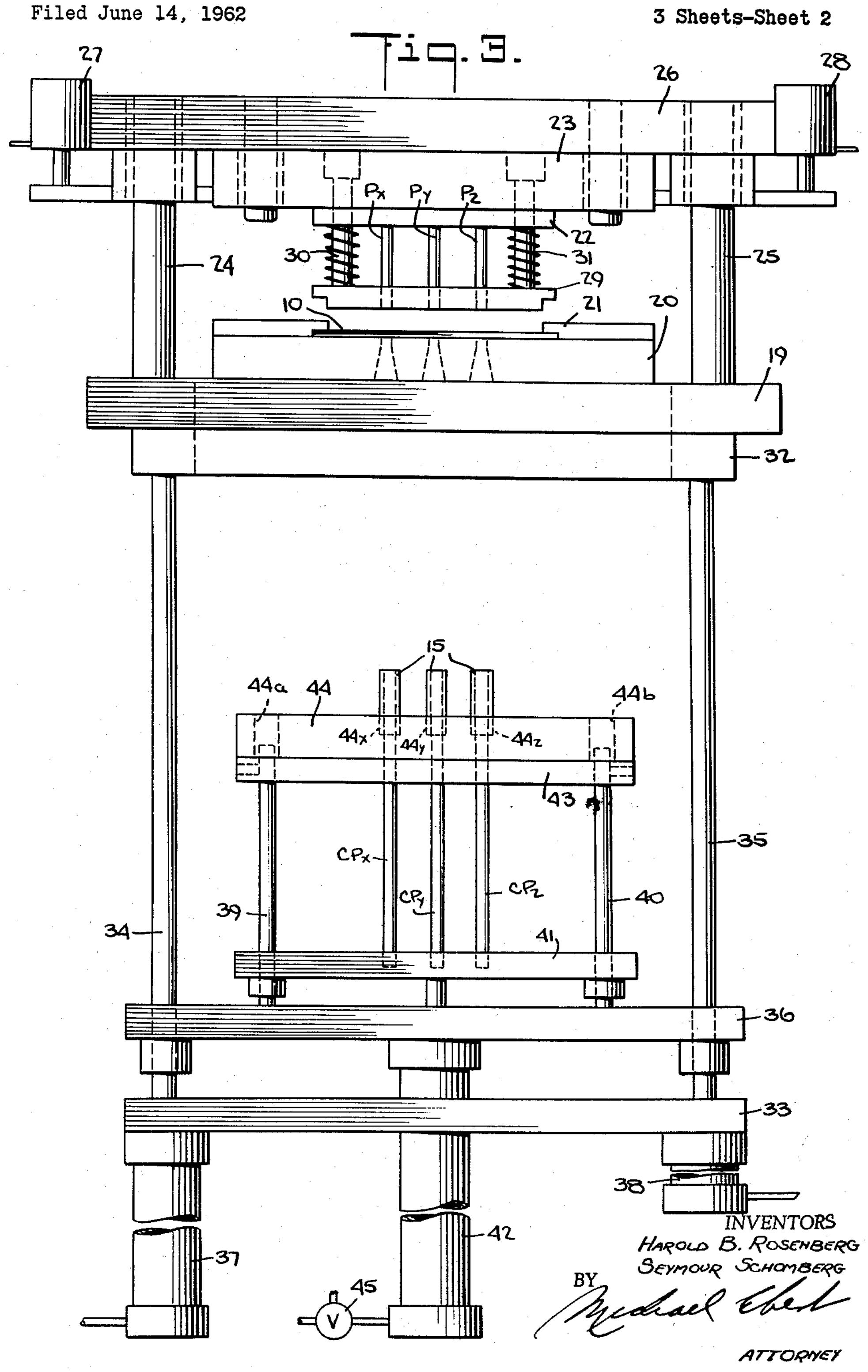
FIG. 3 is a schematic view of an automatic die-cutting and cartridge-loading mechanism in accordance with the invention.

In the conventional practice of making such cartridges, the individual cells are manually inserted one by one in the casing, being sure that the cells all face in the same direction. Various cleaning and testing steps are also involved. In accordance with the present invention, as illustrated in FIG. 3, the die-punching of the cells and the loading of the cartridges are effected automatically by a combination of die cutting and magazine loading sub-assemblies, without prior cleaning or testing, and yet with improved results.

The die cutting mechanism comprises a die shoe base 19, on which is firmly supported a die block 20 having a row of three die apertures DX, DY and DZ, each aperture having an upper cylindrical section communicating with a lower conical section, the upper section having the desired cell diameter and the lower section facilitating the discharge of the punched cells. While only three apertures are shown for reasons of simplicity, in practice a greater number may be used, depending on the size of the individual cells, and the stock size as well.

Mounted on the die block is a guide plate 21 serving to align the selenium stock plate 10 to be punched with the die apertures. Coacting with the die block is a row of three punches PX, PY and PZ, mounted in registration with the die apertures on a punch holder 22.

The punch holder 22 is vertically reciprocated by a travelling plate 23 slidable along railing posts 24 and 25 whose lower ends are anchored in the die shoe base 19 and whose upper ends are attached to the upper die shoe plate 26. The travelling plate is actuated by air cylinders 27 and 28 or other pneumatic, hydraulic or mechanical means to cause the die punches PX, PY and PZ to punch through the selenium stock plate and to enter the complementary die apertures DX, DY and DZ.

In practice the die clearance is chosen to effect a clean shearing action. Otherwise, excessive clearance will result in burrs, while too little clearance gives rise to metal flow or rubbing, which also tends to short the individual cells. The surfaces of the die apertures and the punches, are lapped to ensure smooth cutting surfaces, and preferably are chrome plated.

To hold the plate securely in position during the punching operation, a stripper plate 29 is provided, which is spring-mounted relative to the punch holder 22 and rides on vertical rods 30 and 31 attached to the upper plate 26. Thus when the travelling plate 23 is brought down to force the punches into the die apertures through the stock, the spring stripper plate 29 first engages the selenium plate to hold it firmly in place.

The components located between the die base shoe 19 and the upper plate 23, constitutes the die-punching sub-assembly. It will be evident that the die block 20 may be removed without first dismantling this sub-assembly, and that the punch holder may be similarly removed for sharpening or replacement of the cutting elements.

Mounted below the die punching sub-assembly is a magazine loading sub-assembly comprising an upper plate 32 which engages the lower surface of the die shoe base 11, a base plate 33, and posts 34 and 35 interconnecting these plates, the posts being in vertical alignment with the posts 24 and 25 of the die sub-assembly. While only two supporting posts are shown in both sub-assemblies, it is to be understood that in practice four are used at the corners of the various plates.

Riding on posts 34 and 35 is a gross motion plate 36, which is reciprocated by air cylinders 37 and 38. Supported on the gross motion plate 36 are vertical rails 39 and 40, along which is slidable an elevator block 41 actuated by a hydraulic check system 42. The upper end portions of rails 39 and 40 are fixed to a pin guide block 43, and passing through guide holes in this block are three counter pins $CP_x$, $CP_y$ and $CP_z$, which lie in vertical registration with the die apertures DX, DY and DZ.

Rails 39 and 40 project somewhat above the pin guide block to form guide pins for receiving a cartridge magazine 44 having, as best seen in FIGS. 4 and 5, locating holes *44a* and *44b* for accommodating the guide pins, as well as a row of socket holes *44x*, *44y* and *44z* for receiving the bottom ends of the tubular cartridge casings 15. The socket holes have a lower portion of constricted diameter to prevent selenium cells from falling therethrough. These sockets are concentric with the counter pins $CP_x$, $CP_y$ and $CP_z$.

Figure 6A:
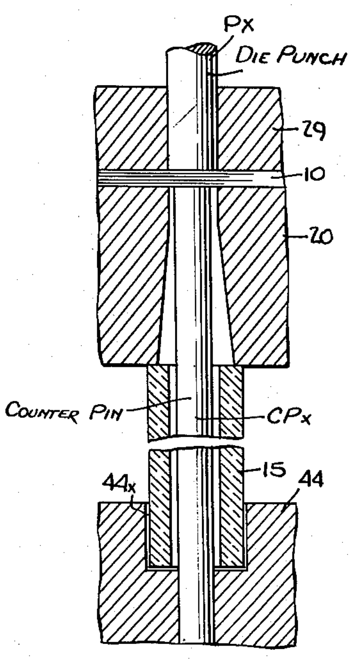
FIGS. 6A, 6B and 6C are sketches showing different phases of the magazine loading operation.
Figure 6B:
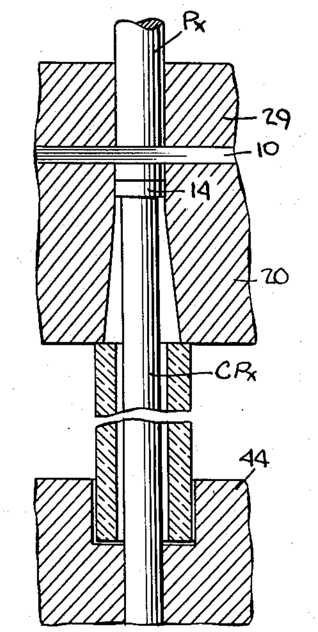
Figure 6C:
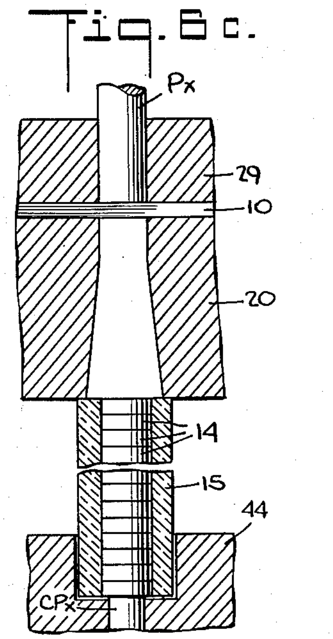

In operation, air cylinders 37 and 38 are first operated to raise the gross motion plate 36 to a position at which the upper ends of the casing 15 engage the under surfaces of the die apertures DX, DY and DZ, as shown in FIGS. 6A, 6B and 6C. The counter pins $CP_x$, $CP_y$ and $CP_z$ are raised by the hydraulic system 42 or other means acting on the elevator block 41 so that they pass through the casings 15 on the magazine into the die apertures DX, DY and DZ initially to engage the under surface of the selenium stock 10. FIG. 6A illustrates the initial position of counter pin $CP_x$ at the start of the die-punching operations. The stock is held rigid by the spring loaded stripper plate 29, and the cell to be punched is clamped between the punch PX and the counter pin $CP_x$. This prevents the stock material from bowing or cold-flowing during the punching operation, and minimizes dragging of the material or other contamination of the edge surfaces of the cell.

The stroke of punch PX is just sufficient to shear a cell from the stock, whereas the hydraulic system, which backs up the elevator for counter pin $CP_x$, is provided with a check valve 45 permitting the pin to step back to an extent equivalent to one punch stroke. Thus with repeated punching operations, as the stock is advanced relative to the die apertures, a succession of cells is punched out and the counter pins recede step by step to make way for the cells, as shown in FIG. 6B, the stock of cells passing through the die aperture and entering the casing 15.

When the selected number of cells has been punched out, the stock is removed from the magazine, and the punches are now advanced into the die apertures by lowering the travelling plate to push the cell stack entirely out of the die apertures in order to fill the cartridge, as illustrated in FIG. 6C.

The magazine of casings having been loaded with cells, is now removed from the pin guide block, this being accomplished by first lowering the gross motion plate 36 to separate the magazine from the die block.

The loaded magazine, as shown in FIG. 7, is constituted by three casings 15 resting in the magazine sockets and filled with a stack of cells. The three casings are clamped together by a clamping block, also shown separately in FIG. 8, constituted by a pair of bars 46 and 47 having complementary arcuate notches which when brought together form bores BX, BY and BZ which conform to the diameter of the casings. The bars are brought together and separated by means of clamping screws 48 and 49, and when clamped on the casings, they also rest on the upper face of the magazine sockets.

The work handling fixture, also shown separately in FIGS. 9 and 10, is constituted by a slab 50 having a longitudinal opening 51 cut therein intermediate the upper and lower faces thereof, the opening extending across the block. The upper surface SA of the slab is provided with three sockets S*x*, S*y* and S*z* adapted to accommodate the casing diameter, and communicating with the opening 51, while the lower face SB is provided with three like sockets S'*x*, S'*y* and S'*z*, into which are inserted headed pins H*x*, H*y* and H*z*, which are spring loaded and held within the sockets by a backing plate 52, the upper ends of the pins penetrating into the sockets S*x*, S*y* and S*z*.

The loaded magazine is assembled into the clamping block and handling fixture, as shown in FIG. 7, with the sockets of the fixture received over the upper ends of the cartridge casings 15 whose lower ends rest in the magazine. The entire assembly is then rotated 180° to lie on the backing plate 52 of the fixture. In this position, the assembly is subjected to ultrasonic and other cleaning procedures, as by means of liquids or gases under pressure. Access to the selenium cells is had through the opening 51 in the fixture.

The magazine is then removed from the fixture, thereby exposing the ends of the cell-filled casings. Termination caps are affixed onto these exposed ends in a suitable air or hydraulic press which may be mounted on an insulating post and electrically isolated from its supporting base to permit electrical inspection at the time of assembly.

With terminal caps on one end of the casing, the fixture may be again returned to its original position, at which the uncapped ends of the cartridges are up-ended. The fixture is removed to expose the uncapped ends of the casings which are still held in the clamp, and terminal caps are pressed thereon, as before.

While there has been shown what is considered to be a preferred embodiment of the invention, it is to be understood that many changes may be made therein without departing from the essential spirit thereof as defined in the annexed claims.

We claim:

1. Apparatus for automatically assembling cartridge-type selenium rectifiers, comprising means including a die block having an aperture therein in operative relation to a reciprocating punch for punching out individual cells from selenium plate stock, means to support a cartridge casing below said block in registration with said aperture, a counter pin extending through said casing into said aperture initially to engage the undersurface of said stock, and check means coupled to said pin to cause said pin to retreat one step equal to the thickness of an individual cell for each stroke of said punch whereby with repeated strokes said cells are successively stacked and are caused to enter said casing while said counter pin prevents tumbling thereof.

2. Apparatus, as set forth in claim 1, wherein said aperture has a circular configuration to produce coin-like cells.

3. Apparatus, as set forth in claim 1, wherein said aperture has a rectangular configuration to produce rectangular-shaped cells.

4. Apparatus for automatically assembling cartridge type selenium rectifiers, comprising a die-cutting mechanism including a die block having an aperture therein in operative relation to a reciprocating punch for punching out individual cells from selenium plate stock, and a magazine loading mechanism including a magazine having a socket to support a cartridge casing below said block in registration with said aperture, a counter pin extending through said socket and casing into said aperture initially to engage the undersurface of said stock, and check means coupled to said pin to cause said pin to retreat one step equal to the thickness of a cell for each stroke of said punch whereby with repeated strokes said cells are successively stacked and are caused to enter said casing while said counter pin prevents tumbling thereof.

5. Apparatus, as set forth in claim 4, further including means in said die cutting mechanism to hold said stock firmly in place during the punching stroke.

6. Apparatus for automatically assembling cartridge-type selenium rectifiers from selenium plate stock, comprising a die cutting mechanism including a die block having an aperture whose dimensions correspond to that of an individual cell, and a punch arranged to reciprocate relative to said aperture, said selenium stock being movable between said die block and said die punch whereby individual cells are punched therefrom, and a magazine loading mechanism including a magazine having a socket formed therein for supporting a cartridge casing below said die block in registration with said aperture, an elevator supported counter pin, said elevator being movable relative to said magazine, means to raise said elevator to cause said counter pin to pass through said socket, said casing and into said die aperture initially to engage the undersurface of said stock, and check means coupled to said elevator to cause said pin to retreat one step equal to the thickness of a cell for each stroke of said die punch whereby with repeated strokes said cells are successively stacked and are caused to enter said casing while said counter pin prevents tumbling thereof.

7. Apparatus for automatically assembling cartridge-type selenium rectifiers from selenium plate stock, comprising a die cutting mechanism including a die block having a plurality of apertures whose dimensions correspond to that of an individual cell, and a set of die punches arranged to reciprocate relative to said apertures, said selenium stock being movable between said die block and said set of die punches whereby individual cells are punched therefrom, and a magizine loading mechanism including a magazine having a plurality of sockets formed therein for supporting cartridge casing below said die block in registration with said apertures, a set of counter pins disposed below said magazine and extending through said sockets, an elevator supporting said set of counter pins and movable relative to said magazine, means to raise said elevator to cause said counter pins to pass through said sockets, said casings and into said die apertures initially to engage the undersurface of said stock, and check means coupled to said elevator to cause said pins to retreat one step equal to the thickness of a cell for each stroke of said die punches whereby with repeated strokes said cells are successively stacked and are caused to enter said casings while said counter pins prevent tumbling thereof.

8. Apparatus for assembling cartridge-type selenium rectifiers from selenium plate stock, a die cutting sub-assembly for punching individual cells from said stock and including a die shoe base, a die block supported on said base and having a row of apertures formed therein, each aperture having an upper cylindrical section having the desired cell diameter, and a lower conical section facilitating the discharge of the pnuched cells, a guide plate mounted on said die block to align the plate stock with said apertures, a punch holder supported for reciprocal movement in the vertical plane above said die block and provided with a row of punches lying in vertical registration with said apertures, a stripper plate spring-mounted relative to said punch holder to engage said stock and hold it in place during the downward stroke of said punches, and means acting on said punch holder to reciprocate same.

9. Apparatus for assembling cartridge type selenium rectifiers from selenium plate stock, comprising a die cutting sub-assembly for punching individual cells from said stock and including a die shoe base, a die block supported on said base and having a row of apertures formed therein, a punch holder supported for reciprocal movement in the vertical plane above said die block and provided with a row of punches lying in vertical registration with said apertures, and power means acting on said punch holder to reciprocate same, and a cartridge loading assembly comprising an upper plate engaging the lower surface of said die shoe base, a base plate, vertical posts connecting said upper and base plates, a gross motion plate slidable on said posts, rails supported vertically on said gross motion plate, a pin guide block fixedly supported in the horizontal plane adjacent the upper ends of said rails, the projecting end portions of said rails forming guide pins, a magazine resting on said guide block and receiver over said guide pins, said magazine having a row of sockets to accommodate the cartridge casings, an elevator slidable on said rails and provided with a row of counter pins which, when said elevator is raised, extend through said pin guide plate and said magazine sockets into said die apertures initially to engage the undersurface of said stock, and check valve means coupled to said elevator to cause said counter pins to retreat one step equal to the thickness of a cell for each stroke of said punches whereby with repeated strokes said cells are successively stacked and are caused to enter said casings while said counter pins prevent tumbling thereof.

10. Apparatus for assembling cartridge-type selenium rectifiers from selenium plate stock, comprising a die cutting sub-assembly for punching individual cells from said stock and including a die shoe base, a die block supported on said base and having a row of apertures formed therein, each aperture having an upper cylindrical section having the desired cell diameter, and a lower conical section facilitating the discharge of the punched cells, a guide plate mounted on said die block to align the plate stock with said apertures, a punch holder supported for reciprocal movement in the vertical plane above said die block and provided with a row of punches lying in vertical registration with said apertures, a stripper plate spring-mounted relative to said punch holder to engage said stock and hold it in place during the downward stroke of said punches, and power means acting on said punch holder to reciprocate same; and a cartridge loading assembly comprising an upper plate engaging the lower surface of said die shoe base, a base plate, vertical posts connecting said upper and base plates, a gross motion plate slidable on said posts, rails supported vertically on said gross motion plate, a pin guide block fixedly supported in the horizontal plane adjacent the upper ends of said rails, the projecting end portions of said rails forming guide pins, a magazine resting on said guide block and received over said guide pins, said magazine having a row of sockets to accommodate the cartridge casings, an elevator slidable on said rails and provided with a row of counter pins which, when said elevator is raised, extend through said pin guide plate and said magazine sockets into said die apertures initially to engage the undersurface of said stock, and check valve means coupled to said elevator to cause said counter pins to retreat one step equal to the thickness of a cell for each stroke of said punches whereby with repeated strokes said cells are successively stacked and are caused to enter said casings while said counter pins prevent tumbling thereof.

11. In a system for automatically assembling selenium rectifier cartridges, wherein individual cells are punched from a selenium plate stock and are pushed into tubular casings one end of which is received in a row of sockets formed in a loading magazine; a work handling fixture for said magazine comprising by a slab having a longitudinal opening formed intermediate the upper and lower faces thereof and extending across the slab, the upper surface having a first row of sockets to accommodate the other end of said casings, the lower surface having a second row of sockets to accommodate spring loaded pins which pass through the sockets in the first row to engage the cells in said casings, said first and second rows of sockets communicating with said opening to facilitate cleaning of the cells in said casings when the fixture is attached thereto.

12. In a system, as set forth in claim 11, further including removable clamp means attachable to said casings on said magazine to maintain the position thereof when the magazine is withdrawn.

References Cited in the file of this patent

UNITED STATES PATENTS

| | | |
|---|---|---|
| 514,239 | Moonelis | Feb. 6, 1894 |
| 2,260,899 | Heftler | Oct. 28, 1941 |